No. 644,697. Patented Mar. 6, 1900.
G. H. UZZELLE.
HEN'S NEST.
(Application filed May 25, 1899.)
(No Model.)

Witnesses:
Geo. E. Fruch.
N. L. Callamer.

Inventor:
George H. Uzzelle
By S. A. Haseltine,
Attorney.

THE NORRIS PETERS CO., PHOTO-LITHO., WASHINGTON, D. C.

United States Patent Office.

GEORGE H. UZZELLE, OF ERNEST, MISSOURI.

HEN'S NEST.

SPECIFICATION forming part of Letters Patent No. 644,697, dated March 6, 1900.

Application filed May 26, 1899. Serial No. 718,160. (No model.)

*To all whom it may concern:*

Be it known that I, GEORGE H. UZZELLE, a citizen of the United States, residing at Ernest, in the county of Dade and State of Missouri, have invented certain new and useful Improvements in Hens' Nests; and I do hereby declare the following to be a full, clear, and exact description of the invention, such as will enable others skilled in the art to which it appertains to make and use the same.

My invention relates to improvements in hens' nests, the object of which is to provide a cheap, simple, and movable hen's nest that will close up as the hen enters the nest to keep out other hens and animals and to open only as the hen starts to leave the nest.

This invention is hereinafter described, and set forth in the claim.

Said invention is illustrated in the accompanying drawings, forming a part of this specification, in which—

Figure 1:
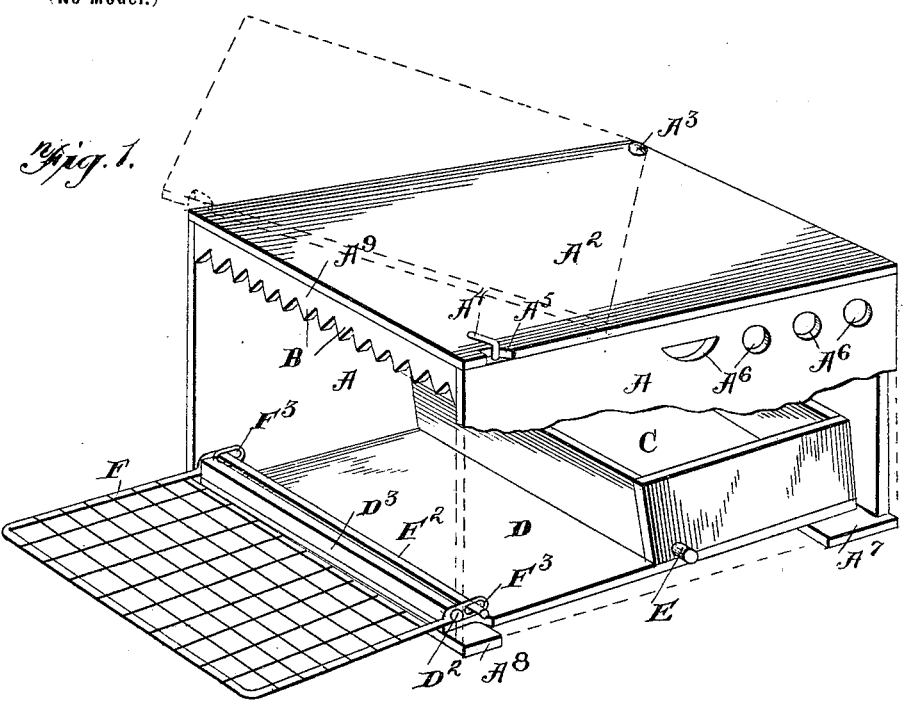
Figure 2:
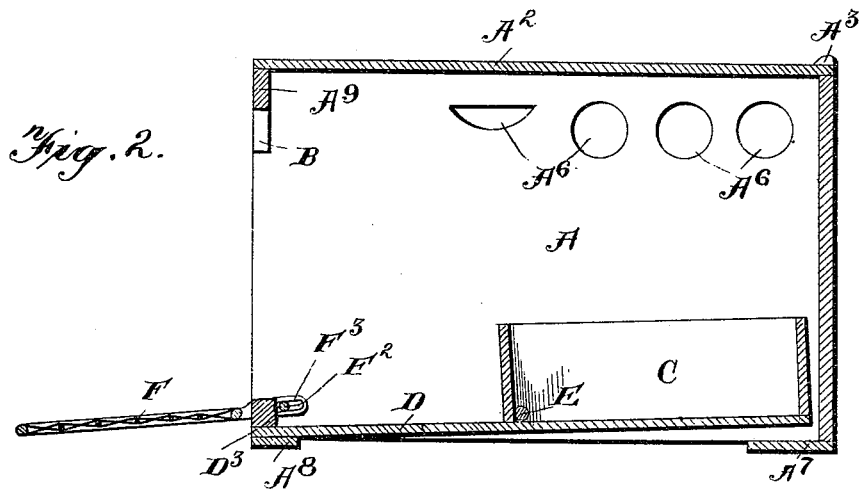

Figure 1 is a view in elevation showing the front side of the device. Fig. 2 is a longitudinal vertical section of the device open.

Similar letters indicate corresponding parts in both figures.

A is an ordinary box, of any desired size and shape, made of any suitable material, having a cover $A^2$, provided with a suitable hinge at one end and any desired fastening at the other. I use a nail $A^3$, driven in one corner to serve as a pivot to swing the cover on, and a notch in the opposite front side $A^5$ to receive a fastening $A^4$, which serves as a stop and also to prevent the cover from being raised when in position.

The box A may be ventilated, as shown at $A^6$. Said box is preferably without a bottom, but has cross-pieces $A^7$ $A^8$ for strengthening the box and also a cross-piece $A^9$ on the upper front side for the same purpose and also to meet the closing gate. Said piece $A^9$ may be provided with brads or notches B when desired.

C is a box of any desired size and shape to use as a hen's nest, formed on or attached to a false bottom D. Said false bottom is pivoted by a rod E or other suitable means for opening and closing the gate F as the hen leaves and enters the nest. For this purpose the box A is made of sufficient length to enable the hen to take two or more steps on leaving the nest before reaching the gate F. Gate F is made of any suitable material, preferably of woven or net wire, to make the same light and permit air to enter the box when the same is closed. Said gate is hinged to the sides of the box A by a rod $F^2$, and for this purpose the back or lower side of the gate is provided with a loop or slot $F^3$ for permitting the gate F to rise on its hinging-pivots $D^2$ with the rising false bottom D to close the gate and the front end of the false bottom D by means of pins $D^2$, extending from a cross-piece $D^3$, for raising and lowering the gate as the front end of the false bottom D is raised or lowered.

The device stands with the gate open when the hen is not on the nest, and as the hen enters the nest C her weight raises the front end of the false bottom D, and this raises and closes the gate F. The said gate may be so hinged that the gate will entirely close the front opening of the box or as nearly so as desired.

Having thus described my invention, what I claim as new, and desire to secure by Letters Patent, is—

The combination in a hen's nest of the box A, open at its front end, the tilting bottom D, the nest-box, C, on the rear portion of the tilting bottom, a gate F having the slotted projections $F^3$, a rod $F^2$ passing through the slots of said projections and having its ends secured in the sides of the box A, and a pivotal connection between the gate and the front end of the tilting bottom in advance of the bar $F^2$, substantially as described.

In testimony whereof I affix my signature in presence of two witnesses.

GEORGE H. UZZELLE.

Witnesses:
W. A. RATHBUN,
S. A. HASELTINE.